May 8, 1934.  V. F. ZAHODIAKIN  1,957,927
PISTON RING
Filed Oct. 30, 1933
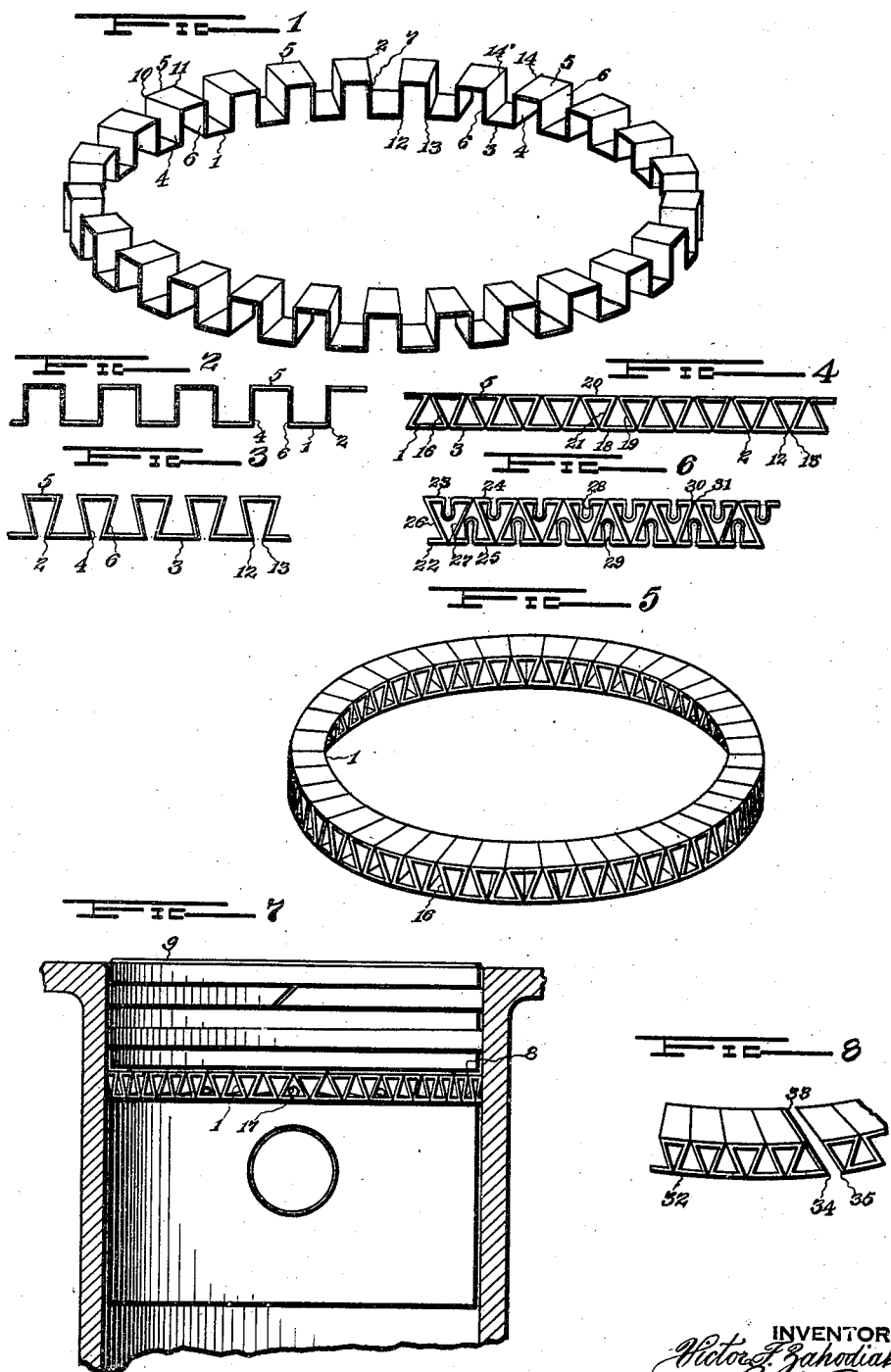
INVENTOR
Victor F. Zahodiakin
BY
ATTORNEY Patented May 8, 1934

1,957,927

UNITED STATES PATENT OFFICE 1,957,927

PISTON RING

Victor F. Zahodiakin, Cincinnati, Ohio

Application October 30, 1933, Serial No. 696,470

9 Claims. (Cl. 309—24)

The invention relates to improvements in piston rings particularly adapted for use in internal combustion engines, and the like.

It is well known that it is intended and desired that an efficient piston ring shall expand outwardly and contact the cylinder wall so that the fuel charge may be compressed in the cylinder without the oil in the cylinder passing between the piston and cylinder wall into the combustion chamber. Therefore, it is necessary that a positive seal shall be provided between the piston and the cylinder wall which can be accomplished only by providing piston rings which expand outwardly with uniform pressure in contact with the entire circumference of the cylinder walls. It is necessary to provide such uniform contacting pressure of the rings with the cylinder wall particularly for the purpose of preventing escape of oil into the combustion chamber, whereby carbon formation is prevented at various parts of the engine such as on the piston, in the piston grooves, valve ports, valves, and in the oil regulating ring. Furthermore, by having uniform pressure of the piston ring with the cylinder walls the oil return holes in the piston ring will not become clogged with carbon. Therefore, the efficiency of the oil ring will remain relatively high irrespective of the age of the ring. Also, the normal oil consumption will be reduced which results in economical operation of the engine. Also, it is important to provide a piston ring so constructed that irrespective of the age of the ring, or the period of time it has been used, that it will continue to exert uniform outward pressure against the cylinder walls. Moreover, it is well known that elimination of the usual split in a conventional piston ring, if it were possible to do so, would greatly increase efficient operation of the engine.

Therefore, the general object of the invention is to provide a piston ring formed from relatively flat or sheet material having great flexibility and relatively light weight, and constructed in such a manner that said ring will give unusually long wear and at all times exert outward uniform pressure in contact with the cylinder walls.

Other objects of the invention are to provide a simple, efficient, practical and economical piston ring adapted particularly to control the quantity of oil on the cylinder walls to effect efficient and economical operation of the engine; to provide a piston ring flexible in all directions adapted to exert uniform outward pressure against the cylinder walls irrespective of the period of its use and irrespective of the angular position of the piston in the cylinder, and without necessity of providing said ring with a split; to provide a piston ring flexible in all directions and unlikely to break either when it is manually compressed for the purpose of inserting it in the piston groove or during the period of its use in the engine; to provide a piston ring having a plurality of sections each of which exert independent outward pressure against the cylinder walls whereby, irrespective of the shape or contour of said walls said piston will seal the space between the piston and said walls; to provide a piston ring having relatively great area of oil passages which are automatically formed relatively completely closed when the ring is compressed for the purpose of placing it in the piston groove, whereby the excess oil is adapted to flow through said passages and return to the crank case in the engine; and to provide a piston ring so constructed that it may be formed from any kind of flat material which has flexibility.

Other objects of the invention will be more fully apparent from the hereinafter description and the accompanying drawing.

The invention consists in forming a piston ring without a split from relatively flat or sheet flexible material.

The invention also consists in the combination of the elements, arrangement of the parts and in the details of the construction as hereinafter fully described and claimed.

In the drawing:

Figure 1 is a general perspective view of the piston ring showing it corrugated in the first stage of construction;

Figure 2 is a fragmentary side view of the piston ring as shown in Figure 1.

Figure 3 is a fragmentary side view of the piston ring showing the same in completed form ready for installation;

Figure 4 is a fragmentary side view of the piston ring showing the corrugations thereof in the position which they take when disposed in the cylinder;

Figure 5 is a perspective view of the ring as shown in Figure 4, illustrating it in compressed position as it would appear in use;

Figure 6 is a fragmentary side view of a modified form of ring incorporating grooves for making the ring flexible.

Figure 7 is a vertical sectional view taken through the cylinder of an internal combustion engine illustrating the ring in position in the piston grooves and within the cylinder;

Figure 8 is a fragmentary perspective view showing a further modification of the ring wherein it incorporates a split.

The ring as illustrated in Figure 1 is formed from a single continuous strip of sheet metal. A circular structure as formed, has its adjacent ends secured together by any conventional means as shown in the first stage of construction (see Fig. 1). The ring is provided with a series of corrugations, or in other words is of zigzag construction. More specifically, upon reference to the drawing, the ring is indicated at 1 and the corrugations at 2. The walls of the corrugations forming the lower horizontal wall of the completed piston ring are indicated at 3, those walls of the corrugations forming the upper horizontal wall of the piston ring are indicated at 5, and the side walls of a particular corrugation at 4 and 6. Now it will be observed from this description that the flat strip of metal has been formed to provide spaced apart horizontal walls, and a series of vertical walls connecting these horizontal walls. Although these referred to spaced apart horizontal walls are not complete in the first operation, they are referred to at this time for the reason that after the ring is completed, as shown in Figure 3, the corrugation walls 5 are brought closer together as are the corrugation walls 3. The identity of these horizontal spaced apart walls becomes more evident in Figures 4 and 5 when the rings are placed in position of use. It is preferable that the spaces 7 of the corrugations have equal area.

The flat sheet metal material from which the ring is formed is flexible, or possesses sufficient resiliency whereby when the ring is compressed from its normal position as shown in Figure 3 to the position shown in Figures 4 and 5, the inherent tension in the material causes the ring to exert radial and circumferential pressures for uniform contact with the cylinder wall.

In the process of forming the ring, the ring is compressed from the first position shown in Figure 1 to the position shown in Figure 3. In this operation, it will be observed that the cross edges 10 and 11 representing the ends of the walls 3 and 5, cannot move closer together. However, the cross edges 12 and 13 of the previously described lower horizontal wall and the cross edges 14 and 14' of the upper horizontal wall move closer together so that the walls 4 and 6, which were previously disposed in vertical position, now are disposed in inclined position with respect to each other. It is preferable that the angle between these walls 4 and 6 and the respective walls 3 and 5 be relatively sharp.

The internal diameter of the finished piston ring, as shown in Figure 3 is less than the diameter of the upper part of the piston, whereas the outer diameter of the piston ring is greater than the diameter of the cylinder bore. Accordingly, when the workman inserts the ring in the usual piston groove 8 of the conventional piston 9, the ring is manually expanded for the purpose of increasing its diameter so that it can be drawn over the head of the piston to registry with the piston ring groove where it automatically contracts into the groove. Thereupon the workman compresses the ring to an external diameter slightly less than the diameter of the cylinder bore, and it is possible to pull the piston into the cylinder.

When the ring is in position of use, it will be observed that a series of substantially closed cross passageways or oil tubes 16 is provided, these passageways or tubes resulting from the spaces formed by the corrugations. The aggregate area of these oil tubes is quite large, whereby all excess oil which is on the cylinder walls, passes readily through the passages 16 and into the usual oil perforations 17 which are drilled in the piston, whereby the oil is adapted to pass through the hollow piston to the crank case of the engine. When the ring formed thus of flat flexible sheet material is placed or compressed into the cylinder, outward radial and circumferential pressures are exerted. The piston ring contacts the cylinder wall at its outer edges 18, 19, 20 and 21, respectively, of the walls 3, 4, 5 and 6. Since the ring is flexible in all directions, and for the reason that independently flexible sections are formed by the corrugations, the ring is highly dilatable and readily conforms not only to general irregularities in the cylinder bore, but to local irregularities as well. Absolute uniform pressure is exerted by the ring and the outer edges of the walls remain in close contact with the cylinder walls at all times.

In Fig. 6 is shown a modified form of the invention in which the piston ring 22 is formed from flexible sheet material and has the corrugation 23 therein formed from the integrally formed horizontal walls 24 and 25 and the integrally formed vertical walls 26 and 27. Formed in the horizontal walls are the corrugations 28 and 29. When the piston ring is compressed, in the form shown in Fig. 6, for the purpose of inserting the same in a piston groove, the ring is compressed so that the edges of the horizontal walls 30 and 31 contact each other, whereby the tension in the ring, resulting from the bending of the metal in the corrugations 28 and 29, results in outward tension of the ring irrespective of the tension resulting from bending the various walls.

In Fig. 8 is shown still another modified form of the invention shown in Fig. 1, of which the ring 32 has the same form of construction as the invention shown in Fig. 1, except that it is provided with the split 33 formed between the ends 34 and 35 of the ring.

An important advantage of the invention is to provide a piston ring which may be quickly and economically manufactured and which is adapted to exert uniform outward pressure with respect to the cylinder walls, irrespective of the period of time it has been used in the internal combustion engine.

Another advantage of the invention is to provide a piston ring which is formed from relatively flat or sheet material and without the usual split, whereby the flow of oil through the usual split is eliminated.

Still another advantage is that the invention may be manufactured in a single operation by a die press, whereby the cost of manufacture is considerably less than the manufacturing cost of the conventional piston ring.

Still another advantage of the invention is that the passages are relatively large, through which the oil flows into the usual oil perforations in the piston, whereby a considerable saving of oil is effected, when compared with the conventional piston ring and at the same time the desired quantity of oil is maintained on the cylinder walls to provide efficient lubrication of the various parts.

Still another advantage of the invention is that the ring is formed from sheet material having corrugations whose walls form a plurality of relatively large passages extending transversely of the piston ring whereby the oil on the cylinder walls is effectively returned through the piston oil perforations to the crank case.

Another advantage is that the ring automatically responds and compensates for expansion, contraction and wear of either the cylinder walls and the ring, or both, and the wear will not affect uniform pressure of the ring with respect to the cylinder walls, and will not decrease efficiency of the ring.

Still another advantage is that the piston ring is flexible whereby breaking of the piston ring is entirely eliminated. Also, this advantage is particularly important when it is considered that in many instances the conventional piston ring breaks while in use in the engine, and without knowledge of the operator, with the result that the cylinder walls are scored to such an extent that often the internal combustion engine is rendered practically useless.

Still another advantage of the invention is that since the outward or radial pressure of the ring is exerted by the plurality of corrugations or sections, the entire circumference of the ring is adapted to uniformly contact the cylinder walls. This is true because the outward pressure of the ring is exerted respectively and independently by the plurality of sections or corrugations whereby, the ring readily conforms to the identical contour of the cylinder walls and, therefore, the space between the piston ring and the cylinder walls is sealed irrespective of the shape of the cylinder. Therefore, oil cannot enter the combustion chamber of the engine regardless of the condition of the cylinder.

Still another advantage is that the ring is formed from relatively flat material whereby any kind of desirable material may be used from which to construct the ring and, also, the ring is relatively light weight.

It is well known that the efficiency of the conventional piston ring in scraping the oil from the cylinder walls is dependent upon the length of the scraping edges. Therefore, an important advantage of the invention is that the oil scraping edges of said ring is at least 100 per cent greater than any piston ring previously manufactured, whereby irrespective of the condition of the cylinder walls and the piston great efficiency of the piston ring is assured.

Still another advantage of the invention is that since the ring is flexible in all directions the angular position of the piston in a worn cylinder will not disadvantageously affect efficient operation of the piston ring, since it will automatically take a proper position to permit the outer edges thereof to have perfect contact with the cylinder walls.

While I believe that the form of the invention illustrated in the drawing and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims.

Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. As an article of manufacture, a corrugated piston ring formed of resilient sheet metal, the corrugations forming tubes in said ring, said tubes opening at the inner and outer peripheries of said ring and being substantially closed at their upper and lower sides, and one portion of each tube being broader than the portion opposite thereto, and said tubes being staggered with respect to and partially overlapping each other.

2. As an article of manufacture, a corrugated resilient piston ring fabricated of resilient sheet metal having a plurality of radial tubes extending therethrough and arranged in staggered overlapping relation, one side of each of said tubes being adapted to be open when the ring is installed on a piston.

3. As an article of manufacture, a corrugated piston ring fabricated of resilient sheet metal, the corrugations forming tubes substantially closed throughout their lengths and opening at the inner and outer peripheries of said ring, each tube having one horizontal wall portion and side wall portions, said horizontal wall portion joining the side wall portions at relatively sharp angles.

4. As an article of manufacture, a corrugated piston ring formed of resilient sheet metal of uniform gauge, the corrugations forming cells opening at the inner and outer peripheries of said ring, each cell having a horizontal wall portion and the greatest internal width of each cell being greater than the thickness of said metal.

5. As an article of manufacture, a resilient circumferentially yieldable piston ring having a plurality of oil passageways extending radially therethrough, said oil passageways having portions arranged in overlapping relation with respect to each other, each of said oil passageways also having a relatively narrow portion communicating directly with one side face of said ring.

6. A flexible piston ring fabricated of a strip of resilient sheet metal and consisting of a series of return bent portions, forming a plurality of overlapping oil conducting tubes substantially closed throughout their lengths extending through said ring.

7. A flexible piston ring fabricated of a strip of resilient sheet metal and consisting of a series of return bent portions forming a plurality of overlapping oil conducting tubes closed throughout their lengths extending through said ring, one portion of at least some of said tubes having depressions formed therein to provide resiliency.

8. As an article of manufacture, a corrugated resilient piston ring fabricated of resilient sheet metal having a plurality of radial tubes extending therethrough and arranged in staggered overlapping relation, one side of each of said tubes being adapted to be open when the ring is installed on a piston, the area of the end edge of each tube being less than the area of the tube opening.

9. As an article of manufacture, a flexible and resilient circumferentially extensible and compressible piston ring fabricated of sheet metal and provided with a series of passageways open at the inner and outer peripheries of said ring, the peripheral cross-sectional area of the bent portions of the ring forming said passageways being less than the cross-sectional area of said passageways.

VICTOR F. ZAHODIAKIN.